United States Patent
Mendes et al.

(10) Patent No.: US 9,677,156 B2
(45) Date of Patent: Jun. 13, 2017

(54) PROCESS FOR SEPARATING AT LEAST ONE FIRST CHEMICAL ELEMENT $E_1$ FROM AT LEAST ONE SECOND CHEMICAL ELEMENT $E_2$, INVOLVING THE USE OF A MEDIUM COMPRISING A SPECIFIC MOLTEN SALT

(71) Applicant: Commissariat a l'energie atomique et aux energies alternatives, Paris (FR)

(72) Inventors: Eric Mendes, Codolet (FR); Olivier Conocar, Pujaut (FR); Nicolas Douyere, Avignon (FR); Thierry Plet, Orange (FR); Jerome Lacquement, Saint Laurent de Carnols (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 350 days.

(21) Appl. No.: 14/410,501

(22) PCT Filed: Jun. 25, 2013

(86) PCT No.: PCT/EP2013/063179
§ 371 (c)(1),
(2) Date: Dec. 22, 2014

(87) PCT Pub. No.: WO2014/001274
PCT Pub. Date: Jan. 3, 2014

(65) Prior Publication Data
US 2015/0340109 A1 Nov. 26, 2015

(30) Foreign Application Priority Data
Jun. 26, 2012 (FR) .................... 12 56034

(51) Int. Cl.
C22B 60/02 (2006.01)
G21C 19/48 (2006.01)
(52) U.S. Cl.
CPC .............. *C22B 60/02* (2013.01); *G21C 19/48* (2013.01); *Y02W 30/884* (2015.05)
(58) Field of Classification Search
None
See application file for complete search history.

(56) References Cited

U.S. PATENT DOCUMENTS

2002/0005357 A1   1/2002   Kondo et al.

OTHER PUBLICATIONS

Conocar et al., "Extraction behavior of actinides and lanthanides in a molten fluoride/liquid aluminum system", Journal of Nuclear Materials, vol. 344, No. 1-3 (Sep. 1, 2005), pp. 136-141.
Conocar et al., "Distribution of actinides and lanthanides in a molten fluoride/liquid aluminum alloy system", Journal of Alloys and Compounds, vol. 389, No. 1-2, (Mar. 8, 2005), pp. 29-33.
International Search Report and Written Opinion for International Application No. PCT/EP2013/063179 dated Jul. 19, 2013.
French Search Report for French Application No. 769691 dated Feb. 8, 2013.

*Primary Examiner* — Melissa Swain
(74) *Attorney, Agent, or Firm* — Miles & Stockbridge P.C.

(57) ABSTRACT

The invention pertains to a process for separating at least one first chemical element $E_1$ from at least one second chemical element $E_2$ coexisting in a mixture in the form of oxides, comprising the following steps:
  a) a step to solubilise a powder of one or more oxides of the said at least one first chemical element $E_1$ and a powder of one or more oxides of the said at least one second chemical element $E_2$ in a medium comprising at least one molten salt of formula $MF—AlF_3$ wherein M is an alkaline element, after which there results after this step a mixture comprising the said molten salt, a fluoride of the said at least one first chemical elements $E_1$ and a fluoride of the said at least one second chemical element $E_2$;
  b) a step to contact the mixture resulting from step a) with a medium comprising a metal in the liquid state, the said metal being a reducing agent capable of predominantly reducing the said at least one first chemical element $E_1$ relative to the said at least one second chemical element $E_2$, after which there results after this step a two-phase medium comprising a first phase called metal phase comprising the said at least one first chemical element $E_1$ in oxidation state 0, and a second phase called saline phase comprising the molten salt of above-mentioned formula $MF—AlF_3$ and a fluoride of the said at least one second chemical element $E_2$.

20 Claims, No Drawings

PROCESS FOR SEPARATING AT LEAST ONE FIRST CHEMICAL ELEMENT $E_1$ FROM AT LEAST ONE SECOND CHEMICAL ELEMENT $E_2$, INVOLVING THE USE OF A MEDIUM COMPRISING A SPECIFIC MOLTEN SALT

TECHNICAL FIELD

The present invention pertains to a method for separating at least one first chemical element $E_1$ from at least one second chemical element $E_2$ involving the use of a medium comprising a specific molten salt.

In the foregoing and in the remainder hereof it is specified that by <<chemical element>> it is meant any chemical element listed in Mendeleev's periodic table of elements.

This method finds particular application in the field relating to the reprocessing of spent nuclear fuel, in particular for the separation of actinide elements from fission products (e.g. lanthanides, transition elements such as molybdenum, zirconium, yttrium, noble metals such as ruthenium, rhodium).

STATE OF THE PRIOR ART

At the present time all schemes followed for the commercial reprocessing of irradiated fuel are based on the PUREX hydrometallurgical process (Plutonium Uranium Refining by Extraction). With this process the irradiated fuel is first dissolved in nitric acid. The resulting solution is then placed in contact with an organic solvent acting as extractant non-miscible with nitric acid, two phases being recovered on completion of this process:
  an organic phase comprising uranium and plutonium; and
  an aqueous phase comprising minor actinides (e.g. americium and curium) and the fission products, which is also called a <<PUREX raffinate>>.

The organic phase comprising the uranium and plutonium undergoes an extraction step to isolate the uranium from the plutonium, these able to be reused to produce uranium and/or plutonium fuel.

The PUREX process is currently used in large capacity commercial plants typically having a reprocessing rate in the order of 1000 t/an. It has benefited from numerous improvements making it a reliable, robust process producing little secondary waste.

However the PUREX process has some disadvantages:
  it is often considered as potentially proliferative since, after extraction of the organic phase, it allows a flow of pure plutonium to be obtained;
  the organic solvent used is sensitive to irradiation and therefore fuels with high burn-up require long cooling times before reprocessing;
  finally, before being subjected to reprocessing, the fuel must be previously dissolved in nitric acid which raises a problem for refractory fuels non-soluble in nitric acid.

Alternatively pyrochemical processes for the reprocessing of spent nuclear fuel using high temperature separating techniques in a molten salt medium were the subject of intensive research in the 70's, either for the reprocessing of spent fuel from conventional reactors or for in-line reprocessing of reactor fuel with molten salt. Molten salts are easily able to dissolve fuels, dedicated targets and refractory matrixes envisaged for the reactors of the future. They use reagents insensitive to irradiation and transparent to neutrons, allowing the reprocessing of fuels with high burn-up after a short cooling time and without constraints of criticality. Finally, they do not allow a flow of pure plutonium to be obtained directly and can therefore be considered less proliferative than the PUREX process.

A molten salt medium containing generally alkaline chloride(s) (e.g. LiCl—KCl, NaCl—KCl—CsCl) has mostly been chosen as solvent compared with a molten salt medium containing fluoride(s) since it raises fewer technological problems for implementation, can be implemented at lower operating temperatures, and corrosion problems are easier to manage allowing the use of stainless steel.

However a chloride molten salt medium raises problems of long-term confinement of the chloride waste it generates.

A fluoride molten salt medium produces waste of fluoride type which unlike chlorides is directly compatible with the glass confinement matrix used for the reprocessing of spent fuel.

Once solubilised in the molten salt medium the elements derived from spent fuel must be selectively separated (e.g. the actinides from the fission products), this selective separation possibly having recourse to two different routes (which does not exclude the combination thereof):
  either electrolysis of the molten salt medium under specific conditions to isolate the selected elements from other elements which will remain in the molten salt medium;
  or selective extraction from the molten salt medium, using a reducing liquid metal.

The principle of pyrochemical reprocessing in a molten salt medium of fluoride(s) involving an extraction step with a liquid reducing metal is in substance based on two successive liquid/liquid extraction steps as illustrated in Mendes et al. (<<Actinides oxidative back-extraction from liquid aluminium in molten chloride media>>, Proceedings of Molten Salts Chemistry and Technology, MS-9, Trondheim, 2011).

At the first step, reducing extraction of the actinides is carried out with a phase comprising liquid aluminium in contact with the molten fluoride salt containing the fuel dissolved in fluoride form. The aluminium acts both as reducing agent and as solvent for the actinides. The redox reaction can therefore be described by the following equation 1:

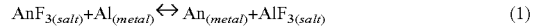

$$AnF_{3(salt)} + Al_{(metal)} \leftrightarrow An_{(metal)} + AlF_{3(salt)} \quad (1)$$

An representing an actinide element.

The choice of fluorides is prompted by the confinement capability of the salt on completion of the process, in particular the possible direct immobilisation of the salt in a glass matrix.

At the second step, the actinides are back-extracted from the metal phase comprising the aluminium e.g. via oxidative back-extraction. To do so the metal phase comprising the aluminium is contacted with a chloride salt containing an oxidizing agent e.g. $AlCl_3$, to back-extract the actinides in the saline phase in chloride form, this back-extraction possibly being represented by following equation (2):

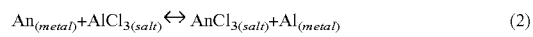

$$An_{(metal)} + AlCl_{3(salt)} \leftrightarrow AnCl_{3(salt)} + Al_{(metal)} \quad (2)$$

An representing an actinide element.

The actinide chlorides thus formed can be converted to oxide(s) and again used as fuel.

Therefore the processes for reprocessing spent fuel using a fluoride molten salt medium require that the elements forming the fuel must be previously converted to fluorides so that they can be added to the salt.

This conversion is conducted (after mechanical and heat treatment of the fuel) at a hydrofluorination step of the fuel by means of chemical digestion with gaseous hydrofluoric acid (dry fluorination). This operation is undeniably one of the most difficult and burdensome steps of the process, since it requires the use of large quantities of toxic gas (HF), placed in contact with a highly active material.

In the light of the foregoing, the authors of the present invention set out to develop a process for separating at least one chemical element from another chemical element, both coexisting in oxide form, involving the use of a molten salt medium containing fluoride(s) and not requiring a hydrofluorination step of the said oxides before the contacting of the said oxides with the said molten salt medium, this process being applicable to the reprocessing of spent fuel.

The authors have therefore discovered that by selecting a suitable molten salt medium containing fluoride(s) it is possible to separate at least one chemical element from another chemical element initially existing in oxide form without it being necessary to carry out prior conversion of the said oxides to fluorides.

DISCLOSURE OF THE INVENTION

The invention pertains to a process for separating at least one first chemical element $E_1$ from at least one second chemical element $E_2$ coexisting in the form of oxides in a mixture, comprising the following steps:

a) a step to solubilise a powder of one or more oxides of the said at least one first chemical element $E_1$ and a powder of one or more oxides of the said at least one second chemical element $E_2$ in a medium comprising at least one molten salt of formula $MF$—$AlF_3$, where M is an alkaline element, after which there is a resulting mixture comprising the said molten salt, a fluoride of said at least one first chemical element $E_1$ and a fluoride of said at least one second chemical element $E_2$;

b) a step to contact the mixture resulting from step a) with a medium comprising a metal in liquid state, said metal being a reducing agent capable of predominantly reducing the said at least one first chemical element $E_1$ relative to the said at least one second chemical element $E_2$, after which there is a resulting two-phase medium comprising a first phase called metal phase comprising the said at least one first chemical element $E_1$ in oxidation state 0, and a second phase called saline phase comprising the molten salt of above-mentioned formula $MF$—$AlF_3$ and a fluoride of the said at least one second chemical element $E_2$.

The process of the invention therefore allows the separation of at least one first chemical element $E_1$ from at least one second chemical element $E_2$ initially coexisting in a mixture comprising one or more oxide forms of these elements, by acting:

first on the capability of a specific molten salt ($MF$—$AlF_3$) to solubilise powders of the said oxide(s) to form fluorides of the said elements; and second, on the choice of specific metal in the liquid state capable of predominantly reducing element $E_1$ in fluoride form to reduce element $E_1$ to its 0 state of oxidation relative to element $E_2$ in fluoride form, the said element $E_1$ thereby being in the metal state and concomitantly taken up in full or in part via chemical affinity in the metal phase comprising the reducing metal in the liquid state, $E_2$ subsisting in full or in part in the saline phase in fluoride form.

The element(s) $E_1$ can be selected from the group formed by the actinides (e.g. uranium, plutonium and/or minor actinides e.g. curium, americium and neptunium), the transition elements (e.g. zirconium or platinum-group elements e.g. rhodium, ruthenium, palladium), whilst the element(s) $E_2$ can be selected from the group not comprising any actinides, this group possibly comprising:

lanthanides (e.g. neodymium, europium, cerium);
transition elements other than those of $E_1$ (e.g. molybdenum, ytterbium);
alkaline or alkaline-earth elements (e.g. strontium); and/or
pnictogenic elements (e.g. antimony).

When $E_1$ and $E_2$ meet the above-mentioned specificities, the process of the invention can therefore come within the scope of the reprocessing of spent nuclear fuel, of transmutation targets used for nuclear physics experiments or of refractory matrixes intended to be included in the composition of nuclear reactors, elements $E_2$ then able to be considered as fission products.

In this configuration, the process can be qualified as a DOS process (Direct Oxide Solubilisation).

Regarding step a), the molten salt is a salt of formula $MF$—$AlF_3$, where M is an alkaline element.

In particular, M is an element selected from among Li, Na, K and the mixtures thereof, and more particularly Li.

In relation to the elements to be separated, persons skilled in the art will select a salt of formula $MF$—$AlF_3$ having a suitable $MF/AlF_3$ molar ratio to obtain efficient separating as a function of the desired objective.

$AlF_3$ can play a major role in the solubilisation mechanism of the oxides, the solubilising of the oxides conventionally being promoted by an increase in the $AlF_3$ molar content of the salt. On the other hand, the efficacy of reducing extraction (corresponding to above-mentioned step b)) may also depend on the $AlF_3$ content of the salt, this being promoted through the use of the least fluoroacid salt i.e. the salt having the least $AlF_3$ content. There may therefore be an antagonistic effect between the efficacy of oxide solubilisation and the performance of reducing extraction which is directly related to the $AlF_3$ molar content of the molten salt.

For example, the $AlF_3$ molar content of the molten salt may lie within a range of 10% to 40 mole %.

More specifically, when one or more actinide elements are to be separated from other elements (such as lanthanides), the molar content of $AlF_3$ may range from 15% to 25 mole %, preferably 25% to 35 mole %.

Regarding step b), the metal in the liquid state is a metal selected for its reducing properties of element(s) $E_1$ relative to element(s) $E_2$ that it is desired to separate.

An efficient metal, in particular for the separation of one or more actinide elements from other elements, is selected from among aluminium and the alloys thereof.

In particular this metal may be in the form of an aluminium alloy or an element selected from among the metal elements meeting the following criteria:

metal elements not having any reducing nature with respect to all the elements contained in the saline phase;
metal elements producing alloys with aluminium which have a melt temperature compatible with the operating temperature of the process.

One metal element advantageously meeting these specificities is copper.

In this latter case, the copper included in the formation of the aluminium alloy does not contribute towards to reduction as such, but contributes towards making the metal phase heavier and thereby facilitates separation via settling between the metal phase and the saline phase.

Step a), to optimise solubilisation of the oxides, can be implemented in an atmosphere having an oxygen partial pressure that is as low as possible. For this purpose step a) can be conducted in an inert atmosphere i.e. an atmosphere comprising an inert gas such as argon, nitrogen. From a practical viewpoint this may entail setting up a constant gas circulation system for the purpose of removing any oxygen which may be released by oxide solubilisation. To ensure closed circuit operation, this system could be equipped with at least one inert gas purification unit.

Step a) can advantageously be conducted at sufficiently high temperature to facilitate solubilisation of the oxides in the molten salt, this temperature being directly dependent on the oxides concerned. For example when the process of the invention is applied to the separation of element(s) $E_1$ of the actinide group from element(s) $E_2$ of another group, the operating temperature may be set at a value ranging from 760 to 860° C., bearing in mind that it is preferable not to exceed 860° C. to prevent major evaporation of $AlF_3$.

Finally, step a) can be conducted under agitation, for example:
via mechanical means e.g. a rotary paddle;
via a counter-current system, in particular when the process is implemented continuously; and/or
via a convective system linked to the convection movements of the molten salt when it is heated.

In particular when step a) and step b) are implemented simultaneously, agitation will also concern the medium comprising the metal in the liquid state, which will allow:
first, the prevented accumulation of fines at the interface of the mixture resulting from step a) and the medium comprising a metal in the liquid state of step b), which could lead to a drop in extraction kinetics; and
second, the removal of oxide <<skin>> which may cover the surface of the medium comprising a metal in the liquid state.

In addition, the constant renewal of the exchange surface between the mixture of step a) and the medium of step b) should improve the kinetics of extraction.

In the process of the invention, provision can be made for a readjustment step of the molar composition of the molten salt. The quantity of $AlF_3$ is subjected to two variations throughout the implementing of the process of the invention. First, the solubilising of the oxides at step a) leads to consumption of $AlF_3$, hence depletion of $AlF_3$ in the molten salt. Second, the implementing of step b) when the metal in the liquid state is aluminium or a mixture thereof leads to formation of $AlF_3$ (hence enrichment of $AlF_3$ in the molten salt). It may therefore be appropriate to determine a material balance between $AlF_3$ consumption and production in order to carry out any necessary readjustment of the molar composition of the salt.

Provision may be made in the invention, concomitantly with step a), for a step to determine the amount of alumina in the mixture of step a) (whose formation may be caused by solubilisation of the oxides in the molten salt at step a)) so that the content thereof does not exceed 3% by weight relative to the total weight of the mixture, since over and above this value the solubilisation of the oxides starts to decrease significantly.

After this determination step, if the quantity of alumina is too high, a step can be provided to draw off some of the mixture of step a) (the portion drawn off possibly being conveyed towards a purification unit to remove the alumina) and to replace the drawn-off portion by a molten salt free of alumina.

When the process is intended to separate elements initially contained in a product containing element(s) $E_1$ and element(s) $E_2$, which is not in the form of a mixture of oxide powders (or a powder that is too coarse) or even which is in non-oxide form (e.g. carbide form), the process before implementing step a) may comprise a step to prepare a mixture of powders intended for step a), this preparation step possibly comprising a step to convert this product to a mixture comprising a powder of one or more oxides of the said at least one first chemical element $E_1$ and a powder of one or more oxides of said at least one second chemical element $E_2$.

This notably concerns the case when the process relates to the reprocessing of spent nuclear fuel, of transmutation targets or refractory nuclear matrixes, the latter conventionally being in the form of compact blocks and in some cases also in the form of carbide(s).

More specifically, when reprocessing concerns spent nuclear fuel containing uranium oxide $UO_2$, the above-mentioned preparation step may use two different routes:
a route involving an operation for mechanical treatment of the spent fuel to form a powder of oxide(s) and a heat treatment operation by voloreduction to remove fission products (called first variant below); and
a route involving a voloxidation operation (called second variant below), after which the uranium oxide $UO_2$ is converted to uranium oxide $U_3O_8$.

According to the first variant, the process comprises an operation to grind the fuel in order to obtain a sufficiently fine oxide powder e.g. having a mean particle diameter ranging from 50 to 100 μm. Throughout this operation all of part of the gaseous or volatile fission products (Kr, Xe, I, Br) are released and optionally conveyed towards a vitrifying unit. The powder obtained is subjected to heat treatment intended to remove volatile fission products, this heat treatment possibly consisting of voloreduction at a temperature ranging from 800° C. to 1500° C. in a controlled atmosphere (e.g. argon with 5% hydrogen). During this treatment the entirety of the caesium, rubidium and tellurium is volatilised as well as all or part of the elements Tc, Cd, As and Se.

According to the second variant, the process comprises mechanical treatment and heat treatment in a single step, this operation possibly being voloxidation after which the uranium oxide $UO_2$ is converted to uranium oxide $U_3O_8$.

More specifically, this operation may consist of oxidation of the fuel conducted at high temperature e.g. a temperature ranging from 480° C. to 600° C., to convert $UO_2$ to $U_3O_8$. Oxidation leads to fragmentation (by volume increase) of the fuel which is thus reduced to a fine powder. As previously, the gaseous and volatile fission products should be removed at this step and optionally conveyed towards a vitrifying unit. The conversion of the fuel to a fine powder should largely aid the dissolution kinetics of the oxides in the salt (via increased surface area).

More specifically when reprocessing concerns spent nuclear products containing uranium carbide, the conversion step is advantageously implemented following the conditions of the second variant described above. In this case it can be envisaged initially to start treatment at 300° C. to convert the fuel to oxide, and secondly to raise the operating temperature to convert $UO_2$ to $U_3O_8$, or directly to start oxidation at voloxidation temperature (the choice is dependent on oxidation performance).

Finally, depending on needs, it could be envisaged to carry out heat treatment with successive voloxidation/voloreduction cycles to improve the removal efficacy of volatile fission products and micronization of the oxide powders resulting from the operation.

Independently of the foregoing, step a) and step b) described above can be performed successively (called first embodiment below) or simultaneously (called second embodiment below).

When the first above-mentioned embodiment is applied to the reprocessing of spent nuclear fuel, of transmutation targets or refractory nuclear matrixes, provision can be made after step a) and before step b) for a digestion step of the element(s) if present in the mixture resulting from step a) and selected from among platinum-group elements (such as Ru, Rh, Pd) and/or molybdenum (the latter being present when the fuel is subjected to a prior voloreduction step as mentioned above) or, if voloxidation/voloreduction cycles are performed, when the last cycle ends with a voloreduction step.

For this purpose this digestion step may entail contacting the mixture resulting from step a) with a medium comprising a metal in the liquid state, the said metal being capable of selectively adsorbing the platinum-group elements and/or molybdenum in relation to elements $E_1$ (e.g. actinides) and $E_2$ contained in the molten salt, this metal possibly being zinc alone or a zinc alloy such as zinc alloyed with copper or zinc alloyed with nickel, after which on completion of this step the following are obtained:

the mixture of step a), which is henceforth free of the said platinum-group element(s) and/or molybdenum; and a metal phase comprising the above-mentioned metal in the liquid state and the said platinum-group element( )s and/or molybdenum.

It is to be understood that the validity of this step is a function of the capability of the oxides such as $UO_2$, to solubilise in the salt in the absence of any reducing agent i.e. the dissolving efficacy of the oxides in a salt free of reducing metal phase.

After the digestion step there follows a separation step of the said metal phase and the said mixture of step a) henceforth free of the said platinum-group element(s) and/or molybdenum, so that it is possible to carry out step b).

The metal phase derived from the said separation step can be subjected to a processing step to recycle the zinc for example simply by vacuum evaporation, the platinum-group element(s) and/or molybdenum when the zinc is initially alloyed to copper and/or nickel, remaining in a mixture with the copper and/or nickel thereby forming waste which can be sent to a vitrifying unit.

If this digestion step is not performed the platinum-group element(s) and/or molybdenum are then extracted with the actinides at step b).

When the second embodiment is applied to the reprocessing of spent nuclear fuel, of transmutation targets or refractory nuclear matrixes (in other words the oxide powder(s) are contacted both with the molten salt medium of step a) and with the medium comprising a metal in the liquid state of step b)) this makes it possible to combine the solubilising of the oxides in the molten salt medium with the reducing extraction of step b), offering the particular advantage due to immediate initiation of actinide extraction, of producing a shift in equilibrium aiding the solubilisation of the actinide oxides via <<pumping effect>>. This second embodiment does not allow the setting up of the digestion step such as defined in the preceding paragraph, this digesting role being passed onto the metal involved in step b). However this second embodiment in the context of reprocessing is more advantageous than the first embodiment in that it is easier to implement having fewer steps.

As mentioned above, after step b) there subsists a first phase called metal phase comprising the said at least one first chemical element $E_1$ in oxidation state 0 and a second phase called saline phase comprising the molten salt of formula MF—$AlF_3$ and a fluoride of the said at least one second chemical element $E_2$.

For the reprocessing of spent nuclear fuel, of transmutation targets or refractory nuclear matrixes, the metal phase may comprise:

as $E_1$ elements: actinides, some transition element such as zirconium, platinum-group elements;

whilst the saline phase may comprise as $E_2$ elements:

lanthanide elements;

transition elements other than those of $E_1$ (such as molybdenum, ytterbium);

alkaline or alkaline-earth elements (such as strontium); and/or pnictogenic elements (such as antimony).

The process of the invention, independently of its field of application, and after step b) may comprise a step c) to separate the metal phase from the saline phase.

For the reprocessing of spent nuclear fuel mentioned above, the metal phase thus separated can be subjected to the following successive treatments:

a back extraction step of the actinide(s) by contacting the metal phase with a molten chloride medium (e.g. LiCl or LiCl—$CaCl_2$) in the presence of an oxidizing agent belonging to the chloride family (for example $AlCl_3$) to convert the actinides in the metal state to actinide chloride(s), a step after which there subsists a metal phase free of actinide(s) and a saline phase (called chloride phase below);

optionally a step to draw off a portion of the said metal phase, with injection of the same amount of <<clean>> metal into the aluminium phase;

a step to covert the actinide chloride(s) to actinide oxide(s) for example via oxidation with $O^{2-}$ ions generating the precipitation of the said actinide oxide(s).

This leaves a product in the form of actinide oxide(s) which can again be used as fuel.

When the objective is the above-mentioned reprocessing, the saline phase on completion of the separation step c) can be subjected to the following successive treatment operations:

a distilling step, to regenerate the medium comprising at least one molten salt of MX—$AlF_3$ type;

a vitrifying step of $E_2$ elements removed from the saline phase after the distillation step.

Other characteristics and advantages of the invention will become apparent from the additional description below.

Evidently this additional description is given for illustration purposes only and is in no way limiting.

DETAILED DESCRIPTION OF PARTICULAR EMBODIMENTS

The following particular embodiments relate to study campaigns conducted on the behaviour of oxides of strategic interest (more specifically the oxides $PuO_2$, $UO_2$, $U_3O_8$, $Nd_2O_3$, $Eu_2O_3$, $CeO_2$, $ZrO_2$, $MoO_3$, $Y_2O_3$, SrO, $Sb_2O_3$, PdO, $RuO_2$ and $Rh_2O_3$ in specific proportions) in media of LiF—$AlF_3$ molten salt type having different molar compositions (different molar compositions for examples 1 to 3 explained below).

The above-mentioned oxides in terms of concentration added to the medium of molten salt type meet the specificities given in the following Table.

| Type of oxide | Concentration of the element added to medium of molten salt type (in mg/g of salt) |
| --- | --- |
| $PuO_2$ | 101.1 |
| $UO_2$ | 33.3 |
| $U_3O_8$ | 33.3 |
| $Nd_2O_3$ | 5.2 |
| $Eu_2O_3$ | 4.5 |
| $CeO_2$ | 5.2 |
| $ZrO_2$ | 5.0 |
| $MoO_3$ | 5.7 |
| $Y_2O_3$ | 4.7 |
| SrO | 4.2 |
| $Sb_2O_3$ | 4.1 |
| PdO | 5.0 |
| $RuO_2$ | 5.8 |
| $Rh_2O_3$ | 3.2 |

The study campaigns were all conducted following the same protocol which comprised the following steps:
- a step for intimate mixing of the $LiF$—$AlF_3$ salt (15 to 20 g depending on experiments) with one or more oxides in the above Table;
- a step to place the mixture resulting from the preceding step in a reaction crucible containing an ingot of Al—Cu alloy (78-22 mole %) of same weight as the $LiF$—$AlF_3$ salt;
- a step to place the crucible in a controlled atmosphere under a constant stream of argon followed by a heating step to about 300° C. to dehydrate the whole;
- a step to heat the crucible to about 835° C. to obtain melting of the crucible content;
- a step to leave the molten mixture under agitation at constant speed for 4 hours;
- a step to take a sample of the two phases (saline phase and metal phase respectively) followed by return to ambient temperature;
- a step for hot dissolution of the samples in 1M $Al(NO_3)_3$, 3M $HNO_3$ for the saline phases (100 mg salt dissolved in 10 mL solution), and in a hot solution of 3M $HNO_3$ and 150 µL of concentrated HF for the metal phases (100 mg of metal dissolved in 10 mL of solution);
- a filtration step to retain the insolubles;
- an optional dilution step of the filtrate in 0.5 M $HNO_3$.

The concentration of the elements was determined in the two above-mentioned phases:
- via count and α spectrometry for ($^{239}Pu+^{240}Pu$);
- via liquid X fluorescence for uranium; and
- via ICP-AES elementary analysis for the other elements (namely Nd, Eu, Ce, Zr, Mo, Y, Sr, Sb, Pd, Ru and Rh).

On completion of the above analyses a material balance was determined for each element (designated <<m>> below), and compared with the material initially added to the crucible.

The percentage of non-solubilised oxide can be estimated rom the following equation:

$$xm_{insoluble} = 100 - (xm_{met} + xm_{salt})$$

where:
- $xm_{met}$ is the percentage of element m contained in the metal phase; and
- $xm_{salt}$ is the percentage of element m contained in the saline phase.

The quantification of each element m in the saline phase and metal phase allows calculation of the distribution coefficient $D_m$, using the following equation:

$$D_m = \frac{Xm_{met}}{Xm_{salt}}$$

where:
- $Xm_{met}$ is the molar fraction of the element m contained in the metal phase; and
- $Xm_{salt}$ is the molar fraction of the element m contained in the saline phase. The calculation of the distribution coefficient $D_m$ does not include the fraction of non-solubilised oxide.

The values $xm_{met}$ et $Xm_{salt}$ can be calculated using the following equations:

$$Xm_{met} = xm_{met}/(xm_{met} + xm_{salt}) \text{ and } Xm_{salt} = xm_{salt}/(xm_{met} + xm_{salt})$$

A global distribution coefficient $E_m$, integrating the fraction of element contained in oxide form after equilibrium (non-dissolved fraction) was evaluated for each element m by determining the ratio:

$$E_m = xm_{met}/(xm_{salt} + Xm_{insoluble})$$

This distribution coefficient (although not determined on thermodynamic equilibrium) indicates the amount of element m present in the metal at the end of the experiment in relation to the initial amount added in oxide form to the crucible.

It is considered that the implementing of the process of the invention is efficient for selective extraction of actinides, if the following conditions are combined:
- the actinides are largely in majority in the aluminium phase; and
- a minimum amount of other elements is contained in the aluminium;

which, in other words, means that the value of the global distribution coefficient of the actinides (symbolised $E_{AN}$) must be high (i.e. Log $E_{AN} > 0$ and ideally Log $E_{AN} > 1$) and that the value of the global distribution coefficient of the fission products (symbolised $E_{FP}$) must be low (i.e. Log $E_{FP} < 0$ and ideally Log $E_{FP} < -1$).

EXAMPLE 1

This example illustrates a campaign of studies conducted on the behaviour of oxides of strategic interest such as defined above conforming to the above-mentioned operating mode in a specific molten salt medium of $LiF$—$AlF_3$ type (containing 35 mole % of $AlF_3$).

This campaign included several tests:
- a first test with $UO_2$ alone entailing the use of 15.7 g of $LiF$—$AlF_3$;
- a second test with $U_3O_8$ alone entailing the use of 15.2 g of $LiF$—$AlF_3$;
- a third test with a mixture comprising $PuO_2$ and $Nd_2O_3$ entailing the use of 17 g of $LiF$—$AlF_3$;
- a fourth test with a mixture comprising $ZrO_2$, $MoO_3$, $RuO_2$, $Rh_2O_3$, PdO and $Nd_2O_3$ entailing the use of 20.1 g of $LiF$—$AlF_3$;
- a fifth test with a mixture comprising SrO, $Y_2O_3$, $Sb_2O_3$, $CeO_2$ and $Eu_2O_3$ entailing the use of 15.1 g of $LiF$—$AlF_3$.

For each of these tests the global distribution coefficient $E_m$ and the distribution coefficient $D_m$ were determined, the methods of determination being explained below for the element(s) of the oxide(s) involved.

The logarithmic values of these coefficients are grouped together in the Table below.

| Element | xm$_{salt}$ | xm$_{met}$ | xm$_{insoluble}$ | Log D$_m$ | Log E$_m$ |
|---|---|---|---|---|---|
| Pu | 4.5 | 90 | 5.5 | 1.30 | 0.95 |
| U (derived from UO$_2$) | 4.1 | 97.9 | 0.0 | 1.38 | 1.38 |
| U (derived from U$_3$O$_8$) | 3.3 | 93.6 | 3.1 | 1.45 | 1.16 |
| Nd (derived from fourth test) | 47.1 | 8.9 | 44.0 | −0.72 | −1.01 |
| Eu | 92 | 1.6 | 6.5 | −1.76 | −1.80 |
| Ce | 80.1 | 12.3 | 7.6 | −0.81 | −0.85 |
| Zr | 28.2 | 11.5 | 60.3 | −0.39 | −0.89 |
| Mo | 50.6 | 10.8 | 38.6 | −0.67 | −0.91 |
| Y | 96.7 | 2.1 | 1.2 | −1.66 | −1.67 |
| Sr | 98.8 | 1.2 | 0.0 | −1.90 | −1.90 |
| Sb | 1.8 | 4.9 | 93.3 | 0.44 | −1.29 |
| Pd | 18.5 | 27.0 | 54.5 | 0.16 | −0.43 |
| Ru | 2.1 | 9.4 | 88.5 | 0.65 | −0.98 |
| Rh | 1.3 | 24.8 | 73.8 | 1.27 | −0.48 |

Several important points emerge from this Table.

The solubilisation of the actinide oxides in LiF—AlF$_3$ (35 mole % of AlF$_3$) (namely PuO$_2$, UO$_2$ and U$_3$O$_8$) is total or near-total (>94.5%). As a result, the coefficients D$_m$ and E$_m$ show similar values. After dissolution of the oxides and extraction equilibrium reached, nearly all the actinides are present in the metal phase which translates as logarithmic values of the distribution coefficients D$_m$ and E$_m$ close to 1 or higher than 1. It is probable that the high extraction of the actinides by the aluminium leads to a shift in equilibrium further promoting solubilisation of the oxide (solubility saturation in the salt never being reached).

The results obtained with UO$_2$ and U$_3$O$_8$ show very similar behaviour both regarding the solubilisation of the oxides and the uranium extraction yield by the metal. This is an important result since it allows validation of the two choices of heat treatment upstream of the solubilisation/extraction step, namely: either recourse to conventional heat treatment (in H$_2$ or Ar atmosphere, after grinding of the fuel) or heat treatment of the fuel via voloxidation process.

The other elements studied all show a very low Log E$_m$ value (<0, even <−1 in most cases) which translates their reduced presence, after equilibrium, in the metal phase.

Two causes could explain the Log E$_m$ values obtained for these elements:
  either low or very low solubility of the oxides in LiF—AlF$_3$;
  or low extraction yield in the metal phase.

The first of these two causes is fully illustrated for the platinum-group elements (Ru and Rh). They display positive Log D$_m$ values meaning that these elements once solubilised in LiF—AlF$_3$, are mostly extracted by the metal phase. As shown in the Table above, their content is very small in the metal phase due to the very low solubility of these elements in LiF—AlF$_3$ (it is more or less zero if the reducing metal is not present).

The second of these causes is fully illustrated for the lanthanide elements and for yttrium and strontium. These elements show very close Log D$_m$ and Log E$_m$ values, demonstrating that their respective oxides are well solubilised in LiF—AlF$_3$. These elements are scarcely extracted from the metal phase during reducing extraction.

Finally, some elements (Nd, Zr, Mo and Pd) are penalised by the accumulation of these two causes, which translates as low solubility and low extraction yield, resulting in Log E$_m$<0 values (even <−1 for some thereof).

Example 1 shows 90% recovery of the plutonium initially placed in the crucible and near-quantitative recovery of uranium, all in a single step. It demonstrates that the initial form of the uranium oxide is compatible with the different envisaged heat treatments for the fuel. Example 1 is a perfect illustration of the feasibility of the separation of actinides/fission products within a DOS process.

EXAMPLE 2

This example illustrates a campaign of studies conducted on the behaviour of oxides of strategic interest (more specifically PuO$_2$, UO$_2$, Nd$_2$O$_3$, ZrO$_2$, MoO$_3$, PdO, RuO$_2$ and Rh$_2$O$_3$) conforming to the above-mentioned operating mode in a specific molten salt medium of LiF—AlF$_3$ type (comprising 15 mole % AlF$_3$).

This campaign comprised several tests:
  a first test with UO$_2$ alone entailing the use of 15.6 g of LiF—AlF$_3$;
  a second test with a mixture comprising PuO$_2$ and Nd$_2$O$_3$ entailing the use of 17 g of LiF—AlF$_3$;
  a third test with a mixture comprising ZrO$_2$, MoO$_3$, RuO$_2$, Rh$_2$O$_3$, PdO and Nd$_2$O$_3$, entailing the use of 21 g of LiF—AlF$_3$.

The global distribution coefficient E$_m$ and distribution coefficient D$_m$ were determined, the methods of determination being explained below for the element(s) of the oxide(s) concerned.

The logarithmic values of these coefficients are grouped together in the Table below.

| Element | xm$_{salt}$ | xm$_{met}$ | xm$_{insoluble}$ | Log D$_m$ | Log E$_m$ |
|---|---|---|---|---|---|
| Pu | 2 | 70 | 28 | 1.54 | 0.37 |
| U (derived from UO$_2$) | 3.7 | 87.7 | 8.6 | 1.37 | 0.85 |
| Nd (derived from third test) | 33.9 | 28.2 | 37.9 | −0.08 | −0.40 |
| Zr | 17.5 | 8.8 | 73.7 | −0.30 | −1.02 |
| Mo | 35.5 | 6.6 | 57.9 | −0.73 | −1.15 |
| Pd | 19.8 | 14.0 | 66.2 | −0.15 | −0.79 |
| Ru | 2.2 | 4.7 | 93.1 | 0.32 | −1.31 |
| Rh | 5.4 | 24.2 | 70.4 | 0.65 | −0.49 |

From this Table the following important points emerge.

As previously, extensive solubilisation of the actinide oxides was observed.

As in Example 1, the distribution coefficients D$_{An}$ and E$_{An}$ obtained after the experiments show values (Log E$_{An}$>0) fully compatible with the implementing of the process of the invention to separate actinides/fission products for the reprocessing of spent fuel.

The other elements studied all show a very low Log E$_m$ value (<0) translating their slight presence, after equilibrium, in the metal phase. As in the preceding example this can be accounted for by the low solubility of their respective oxides in LiF—AlF$_3$, or by a low extraction yield in the metal phase.

EXAMPLE 3

This example illustrates a campaign of studies conducted on the behaviour of oxides of strategic interest (more specifically PuO$_2$, Nd$_2$O$_3$, ZrO$_2$, MoO$_3$, PdO, RuO$_2$ and Rh$_2$O$_3$) conforming to the above-mentioned operating mode in a specific molten salt medium of LiF—AlF$_3$ type (comprising 25 mole % of AlF$_3$).

This campaign comprised several tests:
- a first test with a mixture comprising $PuO_2$ and $Nd_2O_3$ entailing the use of 17 g of $LiF$—$AlF_3$;
- a second test with a mixture comprising $ZrO_2$, $MoO_3$, $RuO_2$, $Rh_2O_3$, $PdO$ and $Nd_2O_3$ entailing the use of 15.7 g of $LiF$—$AlF_3$.

The global distribution coefficient $E_m$ and distribution coefficient $D_m$ were determined, the determination methods being explained below, for the element(s) of the oxide(s) involved.

The logarithmic values of these coefficients are grouped together in the Table below.

| Element | $xm_{salt}$ | $xm_{met}$ | $xm_{insoluble}$ | Log $D_m$ | Log $E_m$ |
|---|---|---|---|---|---|
| Pu | 2.2 | 94 | 3.8 | 1.63 | 1.19 |
| Nd (derived from second test) | 44.9 | 19.5 | 35.6 | −0.36 | −0.62 |
| Zr | 23.6 | 10.0 | 66.4 | −0.37 | −0.96 |
| Mo | 50.1 | 9.2 | 40.8 | −0.74 | −0.99 |
| Pd | 27.6 | 12.1 | 60.3 | −0.36 | −0.86 |
| Ru | 1.4 | 6.9 | 91.6 | 0.68 | −1.13 |
| Rh | 1.0 | 20.5 | 78.5 | 1.31 | −0.59 |

Several important points emerge from this Table.

As previously, extensive solubilisation of plutonium oxide was observed.

As in the preceding examples, the distribution coefficients $D_{An}$ and $E_{An}$ obtained after the experiments show values (Log $E_{An}$>0 or ~1) that are fully compatible with the implementing of the process of invention to separate actinides/fission products for the reprocessing of spent fuel.

The other elements studied all show a very low Log $E_m$ value (<0, even <−1 in most cases) translating their slight presence, after equilibrium, in the metal phase. As in the preceding example, this can be accounted for by the low solubility of their respective oxides in $LiF$—$AlF_3$, or by a low extraction yield in the metal phase.

\* \* \*

It follows from these examples that the campaigns of experiments allowed results to be obtained in terms of recovery of actinides (by the metal phase) that are fully satisfactory. The separation factors between the actinides and the other elements show that the process of the invention can be fully applied to different molar compositions of the salt $LiF$—$AlF_3$.

As previously indicated, the following conditions must advantageously be met: a high global distribution coefficient $E_{An}$, i.e. Log $E_{An}$>0 (ideally, Log $E_{An}$>1) for the actinides and low global distribution coefficient $E_{FP}$ (FP designating the fission products) i.e. Log $E_{FP}$<0 (ideally, Log $E_{FP}$<−1) for all the other elements. The above examples allowed successful fulfilling of these conditions using $LiF$—$AlF_3$ salts having a composition varying between 15 and 35 mole % of $AlF_3$.

The salt of composition $LiF$—$AlF_3$ (comprising 35 mole % $AlF_3$), preferred to the others for facilitated solubilisation of the oxides, is well suited. The yields $E_m$ obtained after experimental validation show that it would be possible to recover more than 99% of the actinides when setting up two stages of extraction. After extraction, the separation factors between actinides and fission products are sufficient to envisage efficient fuel reprocessing. The addition of a washing stage before oxidative back-extraction should further increase the fission product decontamination rates of the actinides.

The integration of the process of the invention in a scheme for the reprocessing of nuclear fuel of oxide or carbide type via reducing extraction in molten fluoride medium ($LiF$—$AlF_3$) leads to a very good actinide recovery rate (typically more than 99% with fewer than three extraction stages) and allows high selectivity between actinides and fission products.

In the developed process, the actinides contained in the irradiated fuel (U, Np, Pu, Am and Cm) remain grouped within one same flow which imparts good proliferation resistance to the process and meets the objectives of fourth generation reactors to reduce the noxiousness of waste with long lifetime. This process scheme can be applied to oxide fuels but also to carbide fuels (through application of suitable heat treatment). The field of application of this process can be extended to the reprocessing of all fuels (such as nitrides) or irradiated targets provided it is possible for them to be converted to an oxide at the head-end of the process thereby providing the process with large flexibility.

The invention claimed is:

1. A method for separating at least one first chemical element $E_1$ from at least one second chemical element $E_2$ coexisting in a mixture in the form of oxides, comprising the following steps:
   a) a step to solubilise a powder of one or more oxides of said at least one first chemical element $E_1$ and a powder of one or more oxides of said at least one second chemical element $E_2$ in a medium comprising at least one molten salt of formula MF—$AlF_3$, where M is an alkaline element, resulting after this step in a mixture comprising said at least one molten salt, a fluoride of said at least one first chemical element $E_1$, and a fluoride of said at least one second chemical element $E_2$; and
   b) a step to contact the mixture resulting from step a) with a medium comprising a metal in the liquid state, the said metal being a reducing agent capable of predominantly reducing said at least one first chemical element $E_1$ relative to said at least one second chemical element $E_2$, resulting after this step in a two-phase medium comprising a first phase which is a metal phase comprising said at least one first chemical element $E_1$ in oxidation state 0, and a second phase which is a saline phase comprising the least one molten salt of above-mentioned formula MF—$AlF_3$, and a fluoride of the said at least one second chemical element $E_2$.

2. The process according to claim 1, wherein the element(s) $E_1$ are selected from the group formed by the actinides, transition elements, and the element(s) $E_2$ are selected from the group not comprising any actinides.

3. The process according to claim 2, wherein the element(s) $E_2$ are selected from the group formed by the lanthanides, transition elements other than those of $E_1$, alkaline or alkaline-earth elements, and/or pnictogenic elements.

4. The process according to claim 1, further comprising reprocessing spent nuclear fuel, transmutation targets used for nuclear physics experimentation, or refractory matrixes included in the composition of nuclear reactors, using said steps a) and b).

5. The process according to claim 1, wherein the molten salt is a salt of formula $LiF$—$AlF_3$.

6. The process according to claim 1, wherein $AlF_3$ is contained in the molten salt up to a molar content of 10 to 40 mole %.

7. The process according to claim 1, wherein the metal in the liquid state at step b) is selected from among aluminium and the alloys thereof.

8. The process according to claim 7, wherein the alloy is an alloy of aluminium and copper.

9. The process according to claim 1, further comprising, before step a), a step to prepare the mixture of powders intended to be used at step a).

10. The process according to claim 9, wherein, when the process relates to the reprocessing of uranium oxide spent nuclear fuel, said step to prepare the mixture of powders further comprises:
    an operation for mechanical treatment of the spent fuel to form a powder of oxide(s); and
    a heat treatment operation by voloreduction to remove volatile fission products.

11. The process according to claim 9, wherein, when the process relates to the reprocessing of uranium oxide spent fuel, said step to prepare the mixture of powders comprises a voloxidation operation after which uranium oxide $UO_2$ is converted to uranium oxide $U_3O_8$.

12. The process according to claim 1, wherein above-mentioned step a) and step b) are performed successively.

13. The process according to claim 12 which, wherein, step a) and step b) are performed successively, further comprises a digestion step of elements selected from among the platinum-group elements and/or molybdenum contained in the mixture resulting from step a), said digestion step being performed after step a) and before step b).

14. The process according to claim 13, wherein the digestion step consists of contacting the mixture resulting from step a) with a medium comprising a metal in the liquid state, said metal being capable of selectively absorbing the platinum-group elements and/or molybdenum relative to the elements $E_1$ and $E_2$ contained in the at least one molten salt, the following being obtained after this step:
    the mixture of step a) being free of said platinum-group element(s) and/or molybdenum; and
    a metal phase comprising the above-mentioned metal in the liquid state and the said platinum-group element(s) and/or molybdenum.

15. The process according to claim 14, further comprising, after the digestion step, a step to separate the mixture of step a) and the metal phase.

16. The process according to claim 1, further comprising, after step b), a step c) to separate the metal phase from the saline phase.

17. The process according to claim 16, wherein when the process relates to the reprocessing of spent fuel, the metal phase thus separated is subjected to the following successive treatments:
    a back-extraction step of the actinide(s) by contacting the metal phase with a molten chloride medium in the presence of an oxidizing agent belonging to the chloride family to convert the actinides in the metal state to actinide chloride(s), after which there subsists a metal phase free of actinide(s) and a chloride saline phase; and
    a step to convert the actinide chloride(s) to actinide oxide(s).

18. The process according to claim 16, wherein the saline phase derived from separation step c) is subjected to the following successive treatments:
    a distilling step, to regenerate the medium comprising at least one molten salt of $MX$—$AlF_3$ type; and
    a vitrifying step of elements $E_2$ removed from the saline phase after the distillation step.

19. The process according to claim 1, wherein above-mentioned step a) and step b) are performed simultaneously.

20. The process according to claim 13, wherein the platinum-group elements comprise Ru, Rh, or Pd.

* * * * *